United States Patent [19]

Doyle

[11] Patent Number: 4,488,888

[45] Date of Patent: Dec. 18, 1984

[54] TABLE TOP AIR FILTER

[75] Inventor: Edward J. Doyle, Hatboro, Pa.

[73] Assignee: Conair Corporation, Edison, N.J.

[21] Appl. No.: 495,037

[22] Filed: May 16, 1983

[51] Int. Cl.³ .............................................. B01D 50/00
[52] U.S. Cl. ....................................... 55/481; 55/504; 55/507
[58] Field of Search ................. 55/467, 473, 481, 504, 55/507, 506, 509, 383, 385 R, 385 A, 385 Y; D23/149

[56] References Cited

U.S. PATENT DOCUMENTS

| D. 266,585 | 10/1982 | Rakocy et al. | D23/149 |
| 3,180,043 | 4/1965 | Larson | 55/467 |
| 3,966,442 | 6/1976 | Waters | 55/507 X |
| 4,043,776 | 8/1977 | Orel | 55/385 Y |
| 4,385,911 | 5/1983 | Popeil et al. | 55/504 X |
| 4,411,675 | 10/1983 | Castella | 55/473 X |

Primary Examiner—Charles Hart
Attorney, Agent, or Firm—Haynes N. Johnson

[57] ABSTRACT

There is disclosed a readily assemblable, inexpensively manufactured table top air filter of the type having a circulating fan. A unitary housing has sides and a top which defines air outlet openings. The bottom of the housing is open. A fan support assembly mounts readily within the housing where it is retained by stops and latch members which are integral with the housing sides. A replaceable filter is also mountable within the housing in line with the fan-induced air flow.

7 Claims, 8 Drawing Figures

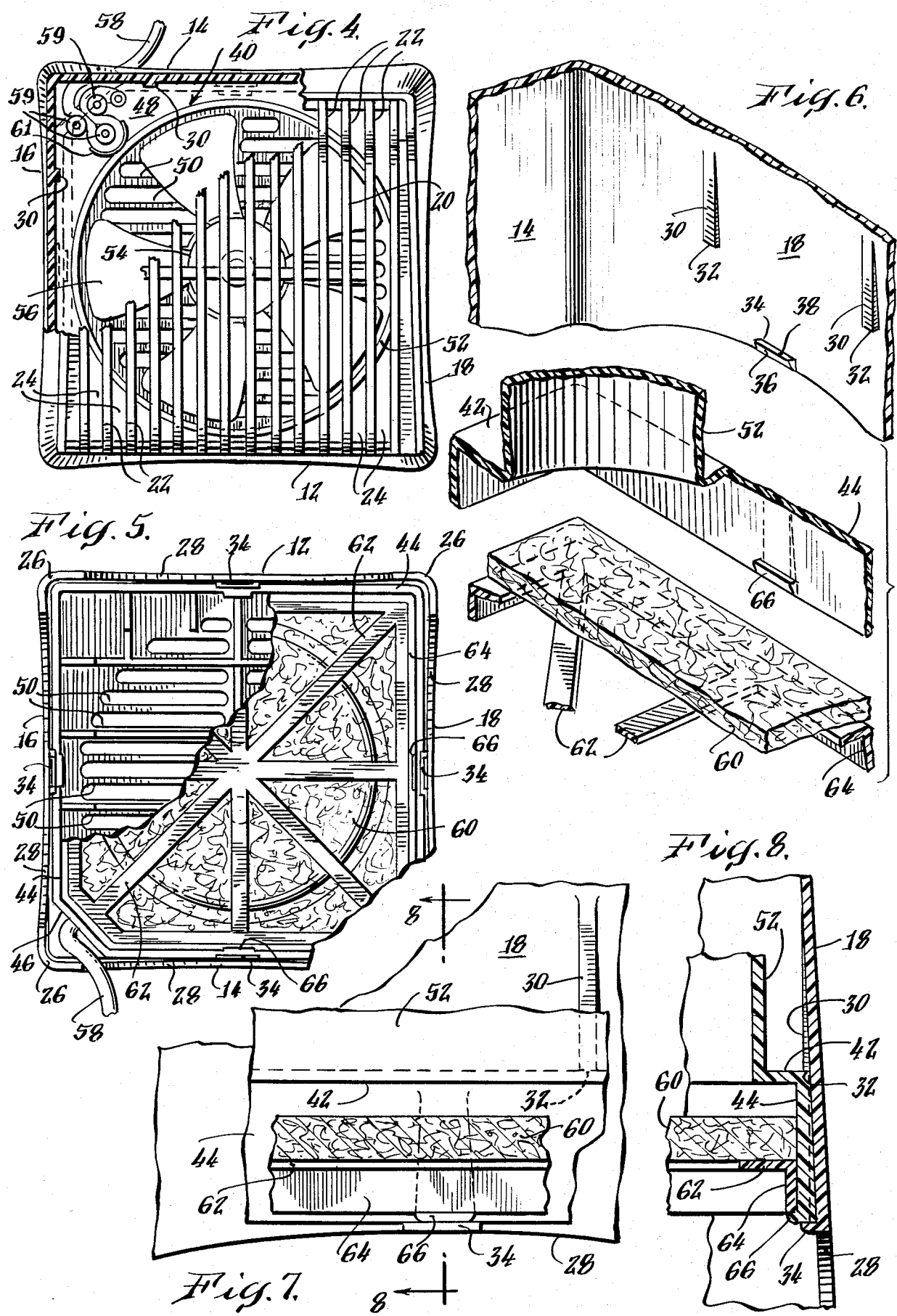

TABLE TOP AIR FILTER

BACKGROUND OF THE INVENTION

This invention pertains to air filters and, more particularly, to small air filters of the table top type having self-contained motor-operated fans. Filters of this type are relatively widely used, particularly in smaller rooms such as found in homes and offices. They are particularly useful for removing particulates such as tobacco smoke from the air. When combined with deodorizing agents in the filter, they are also useful for removing unwanted odors such as kitchen odors.

Air filters of this general type are normally constructed of several parts which are usually molded of plastic. These parts must then be assembled and the labor of assembly adds to the cost of the completed unit.

Accordingly, it is an object of the present invention to provide an air filter which may be assembled with minimum labor from a few integrally molded pieces without the need of special tools. The manner in which this object is achieved will be apparent from the following description and appended claims.

SUMMARY OF THE INVENTION

The invention is a readily assemblable table top air filter which includes a unitary molded plastic housing having substantially vertical sides. The sides are open at the bottom to provide an air inlet and are surmounted by a top with openings which provide an air outlet. A plurality of the sides include inwardly extending stops which are located some distance above the bottom of each side. The vertical sides also include inwardly extending latch members which are located below the stops. A fan support assembly includes a substantially horizontal base which is mountable within the housing between the stops and latch members and defines air passages therethrough. Mounted on the base is a vertically oriented electric motor which, in turn, carries a fan driven by the motor. Replaceable filter means are mountable within the housing between the air inlet and the air outlet.

BRIEF DESCRIPTION OF THE DRAWINGS

FIG. 4 is a top view of the filter, partially broken away to illustrate its internal construction;

FIG. 5 is a bottom view of the filter, partially broken away to illustrate its internal construction;

FIG. 6 is an enlarged exploded view illustrating the manner in which the housing, the base member, and the filter are interrelated;

FIG. 7 is an illustration showing the elements of FIG. 6 in their fully assembled form; and FIG. 8 is a cross-section taken substantially along the line 8—8 of FIG. 7.

DESCRIPTION OF THE PREFERRED EMBODIMENT

Figure 1:
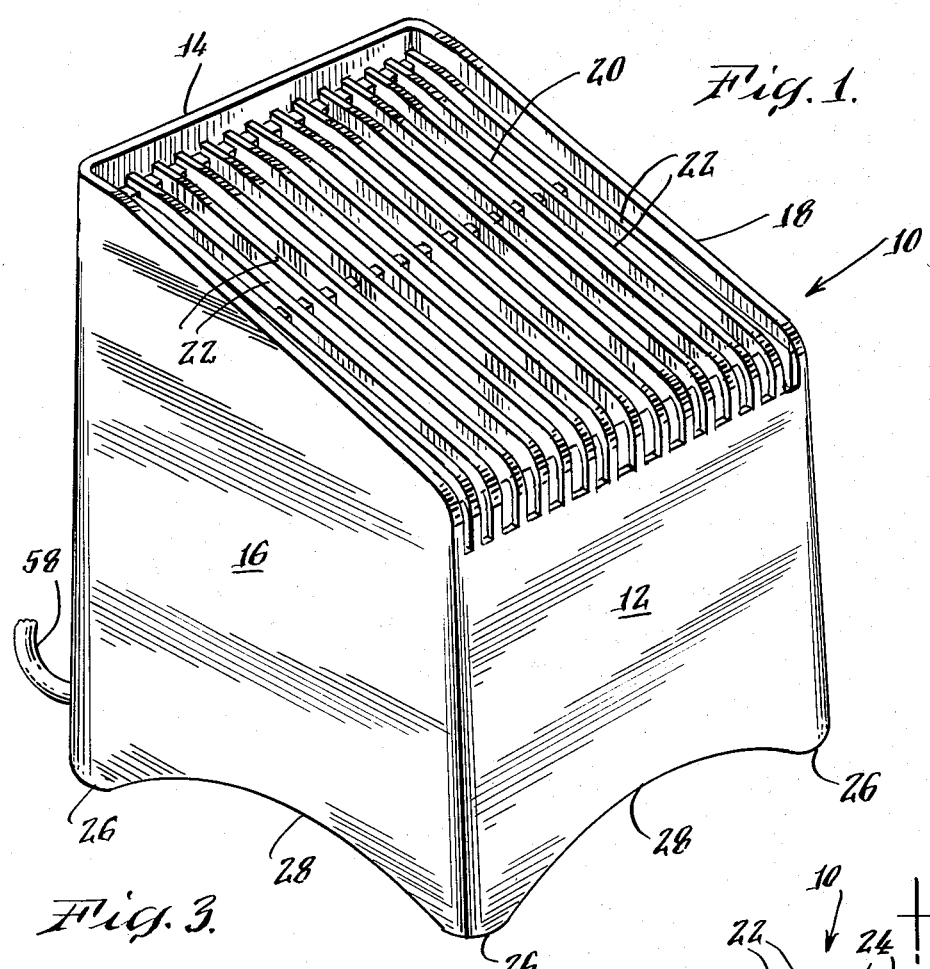
FIG. 1 is a perspective view of an air filter in accordance with the present invention.
Figure 3:
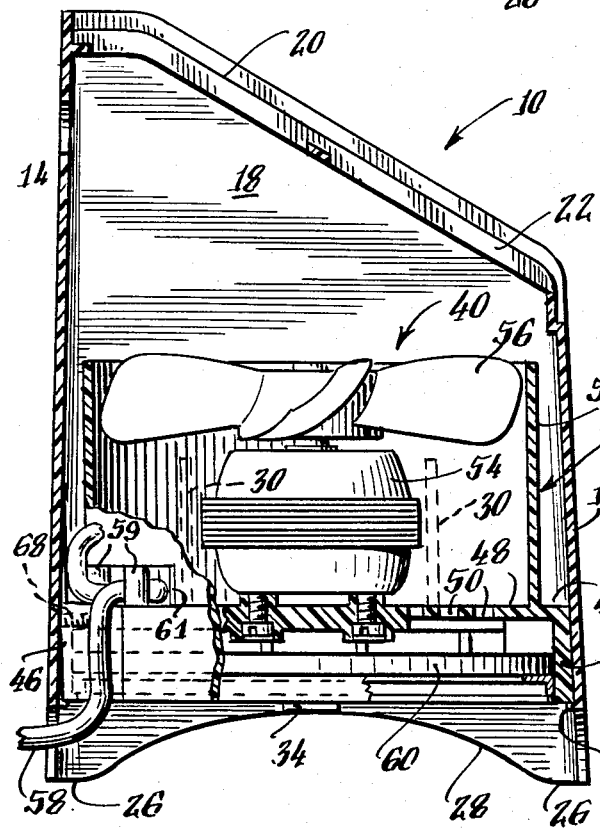
FIG. 3 is a cross-section taken substantially along the line 3—3 of FIG. 2.
Figure 2:
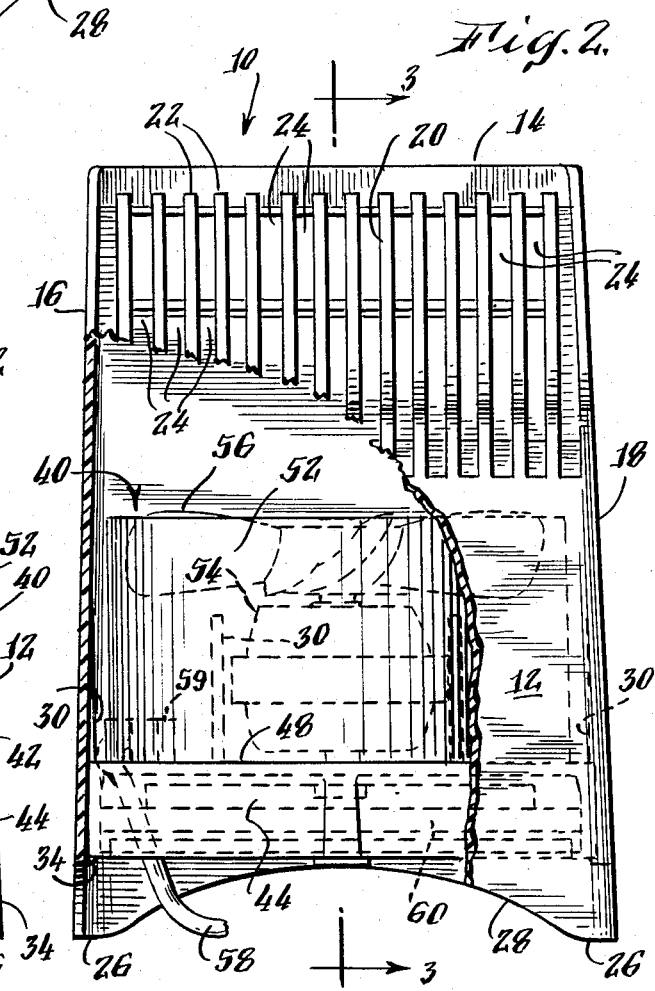
FIG. 2 is a front view of the filter of FIG. 1, partially broken away to illustrate its internal construction.

FIG. 1 illustrates the unitary molded plastic housing 10 of the air filter of the invention. The housing 10 is a shell of substantially rectangular cross-section. It includes a relatively short front sidewall 12 and a higher rear sidewall 14 interconnected by left 16 and right 18 sidewalls. The housing 10 includes a top 20 in the form of louvers 22 defining air outlet openings 24 (FIG. 2). The bottom edge of each of the sides of housing 10 is curved so as to provide four corner feet 26 separated by arcuate air inlet openings 28. It will be noted, especially from FIGS. 2 and 3, that housing 10 is slightly tapered or pyramidal in form. This simplifies the plastic molding process and makes it easier to remove housing 10 from its mold.

Extending inwardly from each of sidewalls 14, 16, and 18 is a pair of stops 30. They are shown most clearly in FIG. 6. Each of the stops 30 is in the form of a slightly inclined ramp terminating in a horizontal shoulder 32. The shoulders 32 of all the stops 30 are in a common plane a predetermined distance above the air inlet openings 28.

Also extending inwardly from each of the sides of the housing and adjacent the edge of the corresponding air inlet opening 28 is a latch member 34. Each of the latch members 34 has a curved or angled lower guide surface 36 and a horizontal upper latching surface 38 as is seen most clearly in FIG. 6.

Mounted within the housing 10 is a fan support assembly 40. Assembly 40 includes a substantially square one-piece molded box-shaped base 42. It is formed with four shallow sidewalls 44 and a short corner wall 46 (FIG. 5). The base 42 is open at the bottom and closed at the top only by a top surface 48 defining air slots 50 therethrough. Integral with, and extending upwardly from, the top surface 48 is a cylindrical shroud 52. Completing the fan support assembly 40 is a motor 54 which is secured to base 42 with its shaft vertical. Secured in turn to the shaft is a fan 56. The fan support assembly 40 is positioned within housing 10 such that its sidewalls 44 are secured between the shoulders 32 and the latch members 34 of the sidewalls. An electrical cord 58 from motor 54 passes through the corner opening between the fan assembly and the housing at corner wall 46 as shown in FIG. 5. Strain relief for cord 58 is provided by three posts 59 and a curved guidewall 61 which are molded integral with, and extend vertically above, surface 48 of base 42. The cord 58 is threaded around and between these elements as shown in FIG. 4, making it mechanically secure.

The filtering function of this invention is performed by a replaceable filter 60. The filter 60 is essentially square and is mounted in the base 42 between the sidewalls 44 of fan support assembly 40. It is held in place by a plastic grill 62 having a square outer rim 64. To engage the rim 64, the sidewalls 44 of the base 42 of the fan support assembly carry internally extending latches 66, which are essentially similar to the latch members 34 on the sidewalls of housing 10. This construction is shown most clearly in FIGS. 6–8.

It will be understood that the plastic material from which the various elements of this invention are constructed has a certain amount of resilience, especially in thin sections. When assembling the invention, the fan 56 may be placed on the shaft of the motor 54. The motor is then inserted within the shroud 52 and screwed to base 42. Fan support assembly 40 may then be inserted into the bottom of the housing 10. The natural resilience of the sidewalls of housing 10 permits the base 42 to pass by the latch members 34. As the base 42 stops against the shoulders 32, the latch members 34 re-engage the bottom of the base so as to lock the fan support assembly 40 securely within the housing 10. As an additional safeguard, a screw 68 (FIG. 3) may also be employed. A replaceable filter 60 is then placed within base 42 between the sidewalls 44 and the grill 62 is snapped in place over the latches 66 in the same way that base 42 is retained by latch members 34. In this manner, the entire filter unit is assembled in a simple and rapid manner with minimum labor and expense.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

What is claimed is:

1. A readily assemblable table top air filter comprising:
   a unitary molded plastic housing having substantially vertical sides open at the bottom to provide an air inlet and a top with openings to provide an air outlet;
   inwardly extending integral stops on a plurality of said vertical sides spaced upwardly from the bottom of each of said sides;
   inwardly extending integral latch members on a plurality of said vertical sides spaced downwardly from said stops;
   a fan support assembly includes (a) a substantially horizontal base member secured within said housing between said stops and latch members, said base defining air passages therethrough, (b) a vertically oriented electric motor mounted on said base member, and (c) a fan driven by said motor;
   said vertical sides being sufficiently resilient to permit said base member to be inserted into said housing and past said latch members during assembly;
   replaceable filter means secured within said fan support assembly and below said fan.

2. The filter of claim 1 wherein each of said latch members is on the same vertical side as a stop.

3. The filter of claim 1 wherein said base member comprises a substantially rectangular base and four sidewalls bounding said base to form a hollow square.

4. The filter of claim 3 wherein said replaceable filter means is mounted within said hollow square.

5. The filter of claim 1 including a removable grill securing said replaceable filter means in position within said housing, and grill latch means on said housing to hold said grill.

6. A readily assemblable table top air filter comprising:
   a unitary molded plastic housing having substantially vertical sides open at the bottom to provide an air inlet and a top with openings to provide an air outlet;
   inwardly extending integral stops on a plurality of said vertical sides spaced upwardly from the bottom of each of said sides;
   inwardly extending integral latch members on a plurality of said vertical sides spaced downwardly from said stops;
   a fan support assembly including (a) a substantially horizontal base member mountable within said housing between said stops and latch members, said base defining air passages therethrough, (b) a vertically oriented electric motor mounted on said base member, and (c) a fan driven by said motor;
   replaceable filter means mountable within said housing between said air inlet and air outlet;
   said housing being of rectangular cross-section with four vertical sides;
   said base member comprising a substantially rectangular base and four sidewalls bounding said base to form a hollow square, said replaceable filter means being mounted within said hollow square, and said base member including a removable grill retained in said hollow square to enclose said filter means therein.

7. A tabletop air filter made of readily-assembled modular units, said units including
   a housing
   a fan support assembly unit, and
   a replaceable filter and support means therefor,
   said housing being integrally molded plastic with substantially vertical sides open at the bottom to define air inlets and supporting legs and a louvered top providing an air outlet;
   said housing including integrally-molded inwardly-extending stops on the inner surfaces of a plurality of said vertical sides and integrally-molded inwardly-extending latches on said vertical sides below said stops, said stops and said latches being so dimensioned and so spaced as to receive and securely hold said fan support assembly unit, and said vertical sides of said housing having sufficient resiliency to permit insertions of said unit therebetween;
   said fan support assembly unit including a substantially horizontal base member dimensioned to fit within said housing between said stops and said latches, said base defining air passages therethrough, a vertically oriented electric motor mounted on said base member, and a fan driven by said motor; said replaceable filter and support therefor including a filter dimensioned to fit within and transversely across said horizontal base member and a removable grill below said filter and filter latch means integrally molded with said horizontal base member to secure said filter in position;
   whereby said table top air filter is provided with modular units which can be snapped together.

* * * * *